US009376113B2

(12) United States Patent
Ono et al.

(10) Patent No.: US 9,376,113 B2
(45) Date of Patent: Jun. 28, 2016

(54) VEHICLE CONTROL DEVICE AND VEHICLE CONTROL METHOD

(71) Applicant: NISSAN MOTOR CO., LTD., Yokohama-shi, Kanagawa (JP)

(72) Inventors: Masashi Ono, Sagamihara (JP); Masahiro Iriyama, Yokohama (JP); Takahiro Yoshino, Yokosuka (JP)

(73) Assignee: NISSAN MOTOR CO., LTD., Yokohama-shi (JP)

( * ) Notice: Subject to any disclaimer, the term of this patent is extended or adjusted under 35 U.S.C. 154(b) by 0 days.

(21) Appl. No.: 14/428,789

(22) PCT Filed: Jul. 19, 2013

(86) PCT No.: PCT/JP2013/069625
§ 371 (c)(1),
(2) Date: Mar. 17, 2015

(87) PCT Pub. No.: WO2014/045697
PCT Pub. Date: Mar. 27, 2014

(65) Prior Publication Data
US 2015/0224993 A1 Aug. 13, 2015

(30) Foreign Application Priority Data

Sep. 19, 2012 (JP) .................. 2012-205885

(51) Int. Cl.
| *G06F 7/00* | (2006.01) |
| *B60W 30/182* | (2012.01) |
| *B60W 10/06* | (2006.01) |
| *B60W 10/107* | (2012.01) |
| *B60W 30/188* | (2012.01) |

(Continued)

(52) U.S. Cl.
CPC ............. *B60W 30/182* (2013.01); *B60W 10/06* (2013.01); *B60W 10/107* (2013.01); *B60W 30/1882* (2013.01); *F16H 61/66272* (2013.01); *B60W 2510/1005* (2013.01); *B60W 2510/105* (2013.01); *B60W 2520/10* (2013.01); *B60W 2540/10* (2013.01); *B60W 2710/0666* (2013.01); *B60W 2720/00* (2013.01); *F02D 29/00* (2013.01)

(58) Field of Classification Search
CPC .......... B60W 30/182; B60W 30/1882; B60W 10/06; B60W 10/107; B60W 2720/00; B60W 2510/105; B60W 2540/10; B60W 2510/1005; B60W 2520/10; B60W 2710/0666; F16H 61/662; F16H 61/02; F02D 29/00
See application file for complete search history.

(56) References Cited

U.S. PATENT DOCUMENTS

| 6,066,070 | A | * | 5/2000 | Ito ........................ B60W 10/06 477/43 |
| 6,181,020 | B1 | * | 1/2001 | Uchida ................. B60W 10/06 290/40 A |

(Continued)

FOREIGN PATENT DOCUMENTS

| CN | 101066675 A | 11/2007 |
| EP | 1 219 490 A2 | 7/2002 |

(Continued)

*Primary Examiner* — David J Hlavka
(74) *Attorney, Agent, or Firm* — Foley & Lardner LLP

(57) ABSTRACT

A vehicle control device that sets a target drive force based on a vehicle speed and an accelerator opening degree, in which if a running mode is switched from a normal mode to an acceleration requirement mode, the target drive force is set based on the accelerator opening degree and the vehicle speed at the time of mode switching.

5 Claims, 5 Drawing Sheets

(51) Int. Cl.
*F16H 61/662* (2006.01)
*F02D 29/00* (2006.01)

(56) References Cited

U.S. PATENT DOCUMENTS

| | | | | |
|---|---|---|---|---|
| 6,440,037 | B2* | 8/2002 | Takagi | B60W 10/06 123/339.1 |
| 6,482,122 | B2* | 11/2002 | Ochiai | B60K 31/0008 477/108 |
| 2002/0123836 | A1* | 9/2002 | Komiyama | B60K 6/46 701/51 |
| 2002/0132702 | A1* | 9/2002 | Muramoto | B60T 7/12 477/183 |
| 2007/0259755 | A1 | 11/2007 | Tanishima | |
| 2007/0276549 | A1* | 11/2007 | Hijikata | B60W 30/182 701/36 |
| 2008/0097674 | A1* | 4/2008 | Kuwahara | B60W 30/182 701/51 |
| 2009/0043468 | A1 | 2/2009 | Kondo et al. | |
| 2009/0105895 | A1* | 4/2009 | Shige | B60L 11/1851 701/22 |
| 2009/0118920 | A1* | 5/2009 | Heap | B60K 6/365 701/54 |
| 2011/0066348 | A1* | 3/2011 | Grubb | B60W 10/023 701/82 |
| 2011/0251771 | A1* | 10/2011 | Takami | B60K 31/0008 701/96 |
| 2012/0252612 | A1 | 10/2012 | Kodama et al. | |
| 2013/0079965 | A1* | 3/2013 | Muta | B60W 10/06 701/22 |

FOREIGN PATENT DOCUMENTS

| | | |
|---|---|---|
| EP | 2 053 281 A2 | 4/2009 |
| JP | 2006-51842 A | 2/2006 |
| JP | 2009-101910 A | 5/2009 |
| WO | WO 2011/074062 A1 | 6/2011 |
| WO | WO 2012/035401 A1 | 3/2012 |
| WO | WO 2013/035447 A1 | 3/2013 |

* cited by examiner

VEHICLE CONTROL DEVICE AND VEHICLE CONTROL METHOD

TECHNICAL FIELD

The present invention relates to a vehicle control device and a vehicle control method.

BACKGROUND ART

JP2006-51842A discloses a conventional control device that sets a target drive force when acceleration is required by a method which differs from a method for setting a target drive force during normal operation.

In the control device disclosed in JP2006-51842A, the target drive force during normal operation is set using a map from an accelerator opening degree and a vehicle speed. Further, the target drive force when acceleration is required is set by adding a running resistance, an accelerator depression correction value, a vehicle speed change correction value, and the like.

SUMMARY OF INVENTION

However, in the above-mentioned conventional invention, the method for setting the target drive force is different during normal operation and when acceleration is required, and there has been a problem that the calculation of the target drive force when acceleration is required is complicated because the target drive force is calculated by an amount of correction and the like rather than a map.

The present invention was created in order to overcome the above-described problem. An object of the present invention is to easily set a target drive force when acceleration is required.

According to an embodiment of the present invention, a vehicle control device includes a target drive force setting unit configured to set a target drive force based on a vehicle speed and an accelerator opening degree, a target speed ratio setting unit configured to set a target speed ratio of a continuously variable transmission so as to realize the target drive force, and a target torque setting unit configured to set a target torque of a drive source based on the target drive force and the speed ratio. The vehicle control device further includes a vehicle speed detection unit configured to detect a vehicle speed, an accelerator opening degree detection unit configured to detect an accelerator opening degree, an acceleration requirement determination unit configured to determine an acceleration requirement based on the accelerator opening degree, and a mode switching unit configured to switch a running mode to a normal mode or an acceleration requirement mode based on the acceleration requirement. If the running mode is switched from the normal mode to the acceleration requirement mode, the target drive force setting unit is configured to set the target drive force based on the accelerator opening degree and the vehicle speed at the time of mode switching.

DESCRIPTION OF EMBODIMENTS

Embodiments of the present invention will now be explained below with reference to the drawings.

Figure 1:
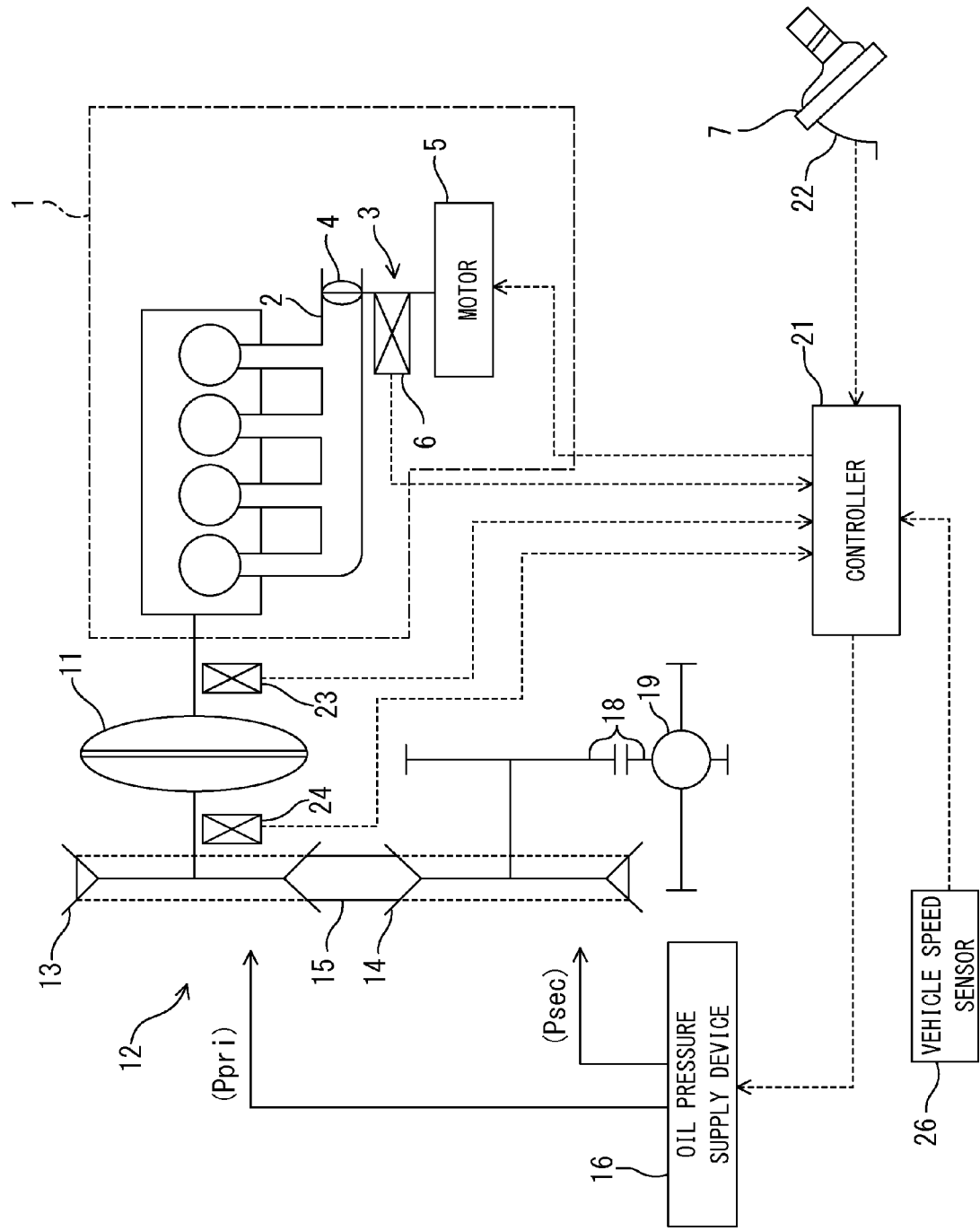
FIG. 1 is a schematic constitutional diagram illustrating a portion of a vehicle according to an embodiment of the present invention.

Referring to FIG. 1, an output of an internal combustion engine 1 of a vehicle is input into a continuously variable transmission 12 via a torque converter 11. The continuously variable transmission 12 includes a primary pulley 13 and a secondary pulley 14, and a V-belt 15 wound around the primary and secondary pulleys 13 and 14. The primary pulley 13 changes its contact radius with the V-belt 15 by changing a groove width according to an oil pressure Ppri. The secondary pulley 14 changes its contact radius with the V-belt 15 by changing a groove width according to an oil pressure Psec. As a result, the continuously variable transmission 12 changes a ratio of an input rotation speed and an output rotation speed, i.e. a speed ratio, to continuously variable in accordance with control of the oil pressure Ppri and the oil pressure Psec. The oil pressure Ppri and the oil pressure Psec are produced by an oil pressure supply device 16.

The secondary pulley 14 is connected to a drive wheel via a final gear 18 and a differential 19.

The internal combustion engine 1 includes an intake throttle device 3 that adjusts an intake air amount. The intake throttle device 3 includes an intake throttle 4 provided in an intake passage 2 of the internal combustion engine 1, and an electric motor 5 that changes an opening degree of the intake throttle 4 according to an input signal.

The oil pressure supply device 16 and the intake throttle device 3 operate according to a command signal output by a controller 21.

The controller 21 is constituted by a microcomputer including a central processing unit (CPU), a read-only memory (ROM), a random access memory (RAM), and an input/output interface (I/O interface). The controller 21 can also be constituted by a plurality of microcomputers.

Detection signals from a throttle opening degree sensor 6 that detects a throttle opening degree of the intake throttle 4, an accelerator opening degree sensor 22 that detects an accelerator opening degree of an accelerator pedal 7 of the vehicle, an engine rotation speed sensor 23 that detects a rotation speed of the internal combustion engine 1, a primary pulley rotation speed sensor 24 that detects a rotation speed of the primary pulley 13, and a vehicle speed sensor 26 that detects a running speed of the vehicle are input as signals into the controller 21.

The controller 21 controls a drive force of the vehicle by performing an opening control of the intake throttle 4 and a shift control of the continuously variable transmission 12 via the oil pressure supply device 16 in accordance with the above-mentioned detection signals.

Figure 2:
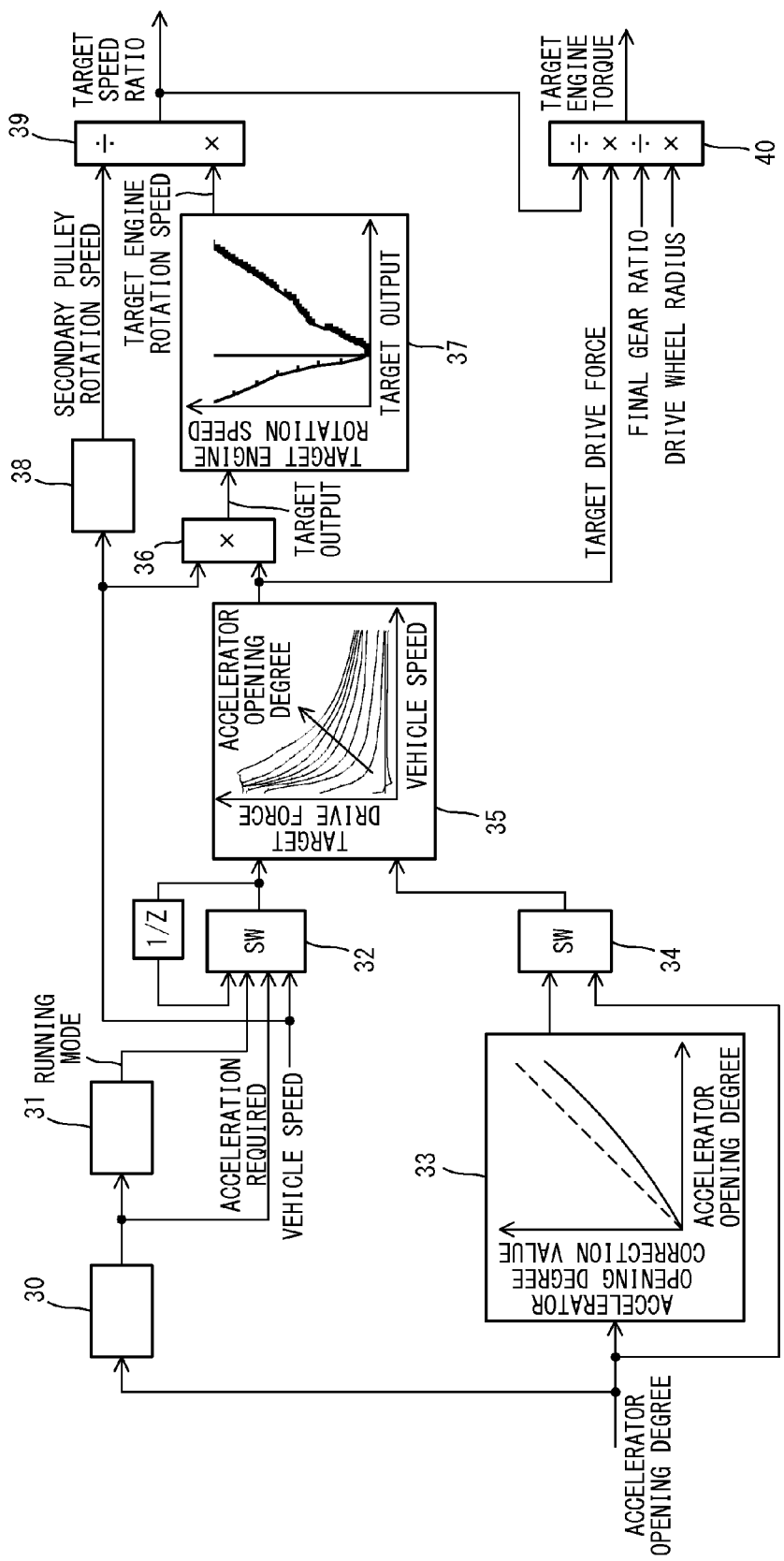
FIG. 2 is a control block diagram explaining methods for setting a target speed ratio and target engine torque according to the embodiment of the present invention.

Next, a method for setting a target speed ratio and a target engine torque according to the present embodiment will be explained using the control block diagram of FIG. 2. The control explained below is executed by the controller 21.

An acceleration requirement determination unit 30 determines an acceleration requirement by an operator based on a signal from the accelerator opening degree sensor 22. Specifically, the acceleration requirement determination unit 30 determines that acceleration is required if an amount of increase per unit of time of the accelerator opening degree is greater than a first predetermined amount of increase. Also, if the accelerator pedal 7 is depressed further and the accelerator opening degree increases above a predetermined opening degree after a running mode is switched to an acceleration requirement mode to be explained later, the acceleration requirement determination unit 30 determines that further acceleration is required. Multiple predetermined opening degrees are set in stages, and the acceleration requirement determination unit 30 determines that further acceleration is required each time the accelerator pedal 7 is depressed further and the accelerator opening degree increases to reach one of the multiple predetermined opening degrees which are set in stages. In other words, the acceleration requirement determination unit 30 determines that further acceleration is required when the accelerator pedal 7 is depressed further in the acceleration requirement mode and the accelerator opening degree reaches a certain predetermined opening degree (for example, the first predetermined opening degree), and then determines again that further acceleration is required when the accelerator pedal 7 is depressed further and the accelerator opening degree reaches another certain predetermined opening degree that has been set next (for example, a second predetermined opening degree). On the other hand, the acceleration requirement determination unit 30 determines that acceleration is not required if the amount of increase per unit of time of the accelerator opening degree is less than the first predetermined amount of increase. After the running mode has been switched to the acceleration requirement mode, the acceleration requirement determination unit 30 determines that acceleration is no longer required if the amount of increase per unit of time of the accelerator opening degree becomes less than the second predetermined amount of increase. The second predetermined amount of increase is a value that is smaller than the first predetermined amount of increase, and is, for example, a negative value.

A mode switching unit 31 switches the running mode of the vehicle to a normal mode or an acceleration requirement mode based on a signal from the acceleration requirement determination unit 30. If it is determined by the acceleration requirement determination unit 30 that acceleration is required, the mode switching unit 31 switches the running mode from the normal mode to the acceleration requirement mode. If it is determined by the acceleration requirement determination unit 30 that acceleration is no longer required, the mode switching unit 31 switches the running mode from the acceleration requirement mode to the normal mode. The mode switching unit 31 maintains the current running mode except in the above-mentioned cases in which it switches the running mode.

When the running mode is in the normal mode, a vehicle speed selecting unit 32 selects a current vehicle speed detected by the vehicle speed sensor 26. When the running mode has been switched from the normal mode to the acceleration requirement mode, the vehicle speed selecting unit 32 selects a vehicle speed detected by the vehicle speed sensor 26 at the time of switching to the acceleration requirement mode and maintains this vehicle speed while in the acceleration requirement mode. When further acceleration is required while in the acceleration requirement mode, the vehicle speed selecting unit 32 updates the maintained vehicle speed to a vehicle speed detected by the vehicle speed sensor 26 at the time further acceleration was required, and maintains this updated vehicle speed. In other words, while in the acceleration requirement mode, the vehicle speed selecting unit 32 updates the vehicle speed each time further acceleration is required and then maintains the updated vehicle speed.

An accelerator opening degree correction unit 33 corrects the accelerator opening degree detected by the accelerator opening degree sensor 22 based on a map, and calculates an accelerator opening degree correction value. The accelerator opening degree correction value is smaller than the accelerator opening degree before correction.

An accelerator opening degree selecting unit 34 selects the uncorrected accelerator opening degree or the accelerator opening degree correction value according to the running mode. The accelerator opening degree selecting unit 34 selects the uncorrected accelerator opening degree when the running mode is in the normal mode, and selects the accelerator opening degree correction value when the running mode is in the acceleration requirement mode.

A target drive force setting unit 35 sets the target drive force based on the vehicle speed selected by the vehicle speed selecting unit 32 and the accelerator opening degree selected by the accelerator opening degree selecting unit 34.

If the running mode is in the normal mode, the target drive force setting unit 35 sets the target drive force from a map based on the current vehicle speed detected by the vehicle speed sensor 26 and the uncorrected accelerator opening degree.

When the running mode has been switched from the normal mode to the acceleration requirement mode, the target drive force setting unit 35 sets the target drive force from a map based on the vehicle speed detected by the vehicle speed sensor 26 at the time of switching to the acceleration requirement mode and the corrected accelerator opening degree.

If the running mode is in the acceleration requirement mode, the target drive force setting unit 35 sets the target drive force from a map based on the maintained vehicle speed and the corrected accelerator opening degree. When the running mode is in the acceleration requirement mode and further acceleration is required, the vehicle speed is updated from the vehicle speed that was maintained to a vehicle speed detected by the vehicle speed sensor 26 at the time further acceleration was required. Thus, the target drive force setting unit 35 sets the target drive force from a map based on the updated vehicle speed and the corrected accelerator opening degree.

In the target drive force setting unit 35, even if the running mode is in the acceleration requirement mode, an upper limit value of the target drive force is set based on the current vehicle speed and accelerator opening degree. If the target drive force that is set in the acceleration requirement mode is greater than the upper limit value, the target drive force is set to the upper limit value.

A target output setting unit 36 sets a target output by multiplying the target drive force set by the target drive force setting unit 35 and the current vehicle speed detected by the vehicle speed sensor 26.

A target engine rotation speed setting unit 37 sets the target engine rotation speed from a map based on the target output.

A target output rotation speed calculating unit 38 calculates a rotation speed of the secondary pulley 14 of the continuously variable transmission 12 based on the vehicle speed detected by the vehicle speed sensor 26.

A target speed ratio setting unit 39 sets a target speed ratio by dividing the target engine rotation speed by the rotation speed of the secondary pulley 14.

A target engine torque setting unit 40 sets a target engine torque by multiplying the target drive force and the radius of the drive wheel and then dividing the resulting value by the target speed ratio and the final gear ratio.

The continuously variable transmission 12 is controlled based on the target speed ratio set as described above, and the intake throttle 4 is controlled based on the target engine torque set as described above.

Next, changes in the target drive force and the acceleration of the vehicle in the acceleration requirement mode when using the present embodiment will be explained referring to the time chart of FIG. 3.

At a time t0, the accelerator pedal 7 is depressed and acceleration is required, and thus the running mode switches from the normal mode to the acceleration requirement mode. Thereby, the vehicle speed for setting the target drive force is maintained at a vehicle speed at the time of switching to the acceleration requirement mode. Herein, the accelerator opening degree is constant, and the target drive force is also constant. Also, since the accelerator opening degree and the target drive force are constant, the acceleration of the vehicle is maintained.

Figure 3:
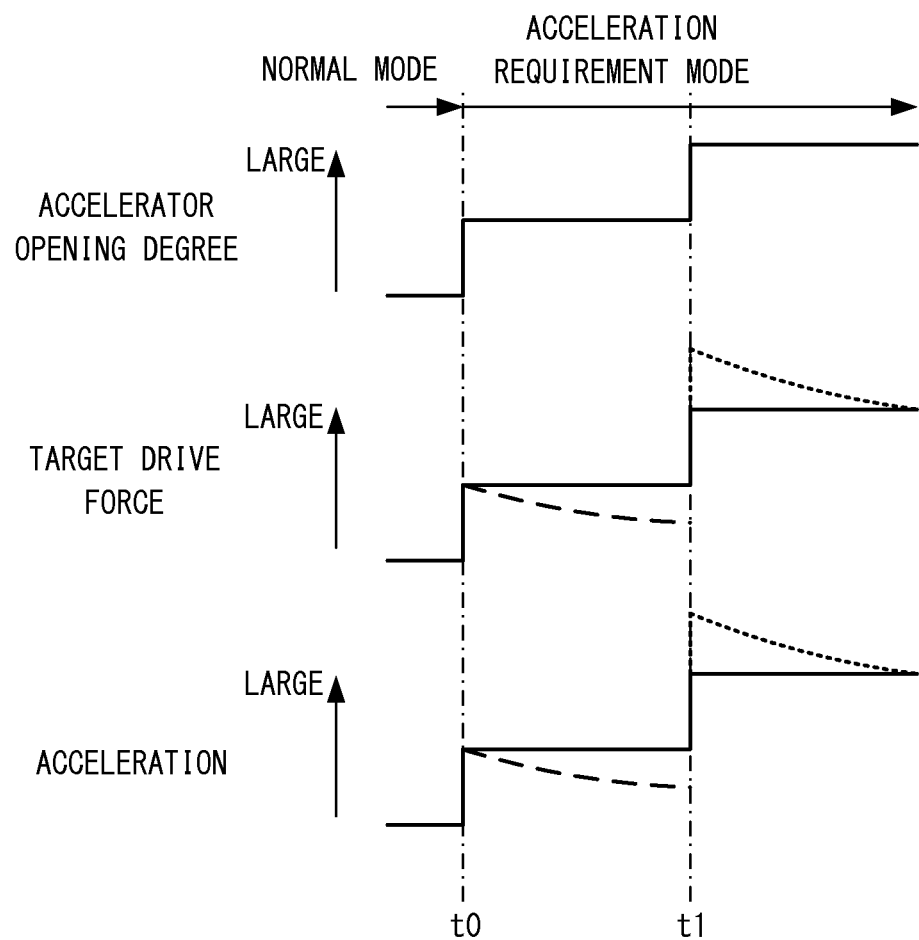
FIG. 3 is a time chart illustrating changes in a target drive force and a vehicle acceleration according to the embodiment of the present invention.

If the target drive force is set based on the current vehicle speed detected by the vehicle speed sensor 26 without using the present embodiment, the vehicle speed would increase and the accelerator opening degree would be constant, and thus the target drive force would decrease as shown by the dashed line in FIG. 3. Thus, the vehicle acceleration would also decrease.

Figure 4:
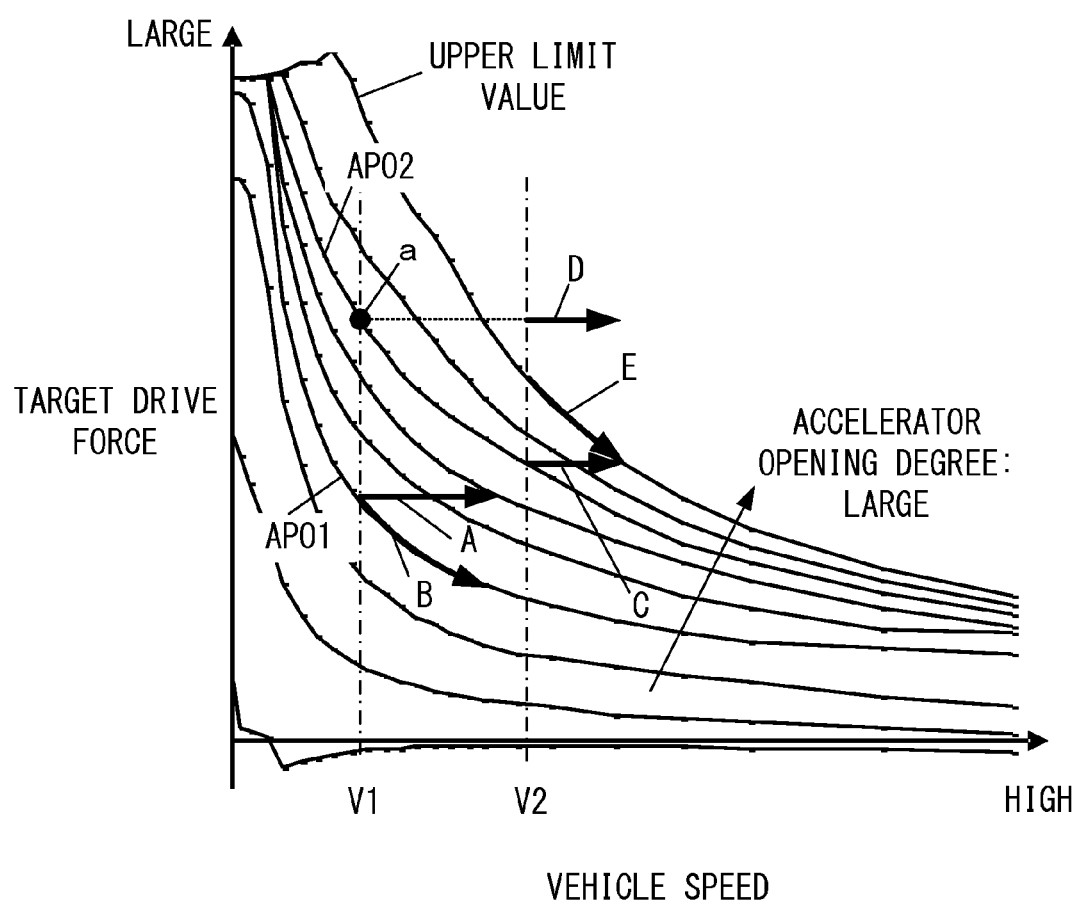
FIG. 4 is a map explaining a target drive force in an acceleration requirement mode.

Herein, the above will be explained using the map for setting the target drive force shown in FIG. 4. If the running mode is modified from the normal mode to the acceleration requirement mode at a vehicle speed V1 and an accelerator opening degree APO1, in the present embodiment, the vehicle speed for setting the target drive force is maintained at the vehicle speed V1. Therefore, if the accelerator opening degree APO1 is constant, the target drive force stays constant as shown by the arrow A even if the actual vehicle speed increases.

On the other hand, if the target drive force is set based on the current vehicle speed without using the present embodiment, the target drive force decreases as shown by the arrow B.

In this way, in the present embodiment, since the target drive force is large, the acceleration ability of the vehicle when acceleration is required is good.

Returning to FIG. 3, at a time t1, the accelerator pedal 7 is depressed further and further acceleration is required. Thereby, the vehicle speed for setting the target drive force is updated to a vehicle speed at the time further acceleration was required. The target drive force is set based on this updated vehicle speed.

Herein, the case in which the vehicle speed is not updated will be explained using the map shown in FIG. 4.

The running mode is modified from the normal mode to the acceleration requirement mode at the vehicle speed V1 and the accelerator opening degree APO1, and the accelerator pedal 7 is depressed further at the time the actual vehicle speed reaches "V2". The accelerator opening degree is then modified from "APO1" to "APO2", and further acceleration is required. In the present embodiment, the target drive force stays constant as shown by the arrow C even if the vehicle speed for setting the target drive force is updated from "V1" to "V2" and then the actual vehicle speed increases.

On the other hand, if "V1" is maintained without updating the vehicle speed, the target drive force is set based on the vehicle speed V1 and the accelerator opening degree APO2 and thus becomes a value illustrated by point "a". Therefore, the target drive force stays constant as shown by the arrow D even if the actual vehicle speed increases. However, this target drive force is larger than the upper limit value set based on the current vehicle speed, and thus the target drive force is actually restricted as shown by the arrow E. Therefore, the target drive force decreases as the actual vehicle speed increases, and the acceleration also gradually decreases (the target drive force and the acceleration of the vehicle in this case are illustrated by the dotted lines in FIG. 3).

By updating the vehicle speed as described above, the acceleration at the time the accelerator pedal 7 is depressed further becomes smaller than the acceleration in the case that the vehicle speed is not updated. However, subsequent decreases in the acceleration can be suppressed, and thus the extension of the acceleration can be maintained.

The effects of this embodiment of the present invention will now be explained below.

If the running mode is switched from the normal mode to the acceleration requirement mode, the target drive force is set based on the accelerator opening degree and the vehicle speed at the time of mode switching. Thereby, even in the acceleration requirement mode, the target drive force can be set using the map used in the normal mode. Therefore, the target drive force can be set without any complicated calculations, and thus the vehicle can be accelerated.

If the running mode is in the acceleration requirement mode, by maintaining the vehicle speed for setting the target drive force, the target drive force can be inhibited from decreasing together with an increase in the actual vehicle speed. Thus, the acceleration ability of the vehicle can be improved.

If the running mode is in the acceleration requirement mode, the vehicle speed is maintained at the vehicle speed at the time of mode switching. However, the target drive force can be set according to the accelerator opening degree, and thus the target drive force can be set according to the depression of the accelerator pedal 7 by an operator and the vehicle can be accelerated.

If further acceleration is required after the running mode has entered the acceleration requirement mode, the vehicle speed for setting the target drive force is updated to a vehicle speed at the time that further acceleration was required. Thereby, the target drive force can be inhibited from being restricted by the upper limit value, the target drive force and the acceleration can be inhibited from decreasing along with an increase in the vehicle speed, and the extension of the acceleration can be maintained.

Figure 5:
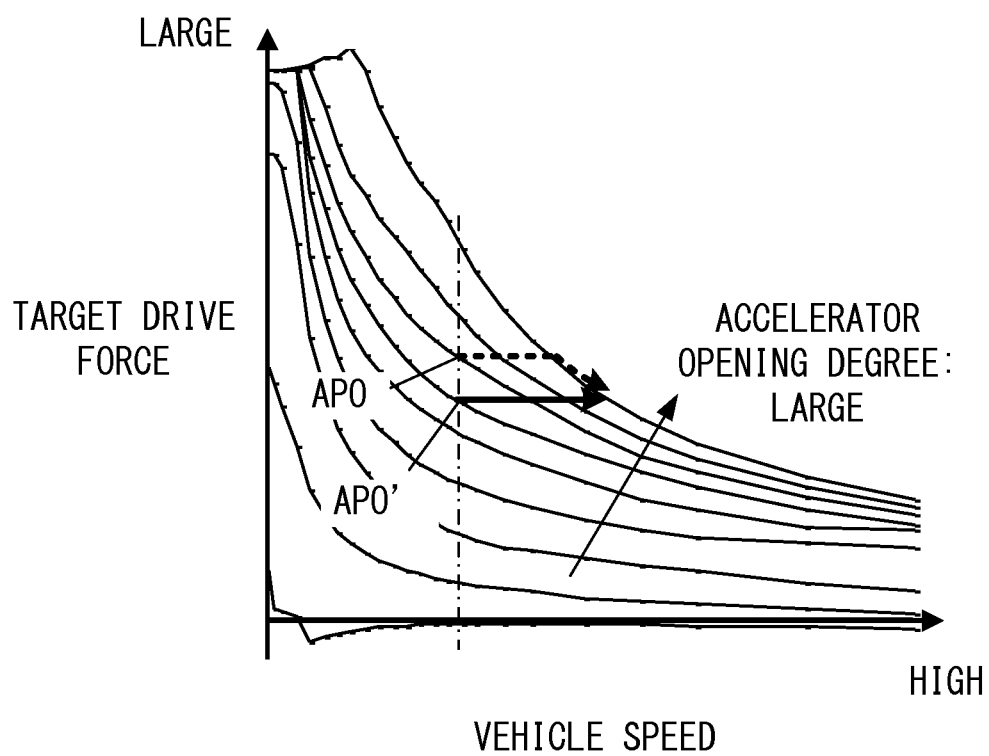
FIG. 5 is a map explaining a target drive force in an acceleration requirement mode.

If the running mode is in the acceleration requirement mode, the accelerator opening degree is corrected so as to be less than the accelerator opening degree in the normal mode, and the target drive force is set using the accelerator opening degree correction value. If the running mode is in the acceleration requirement mode, for example, an accelerator opening degree APO detected by the accelerator opening degree sensor 22 is corrected to an accelerator opening degree APO' as shown in FIG. 5. Thereby, the target drive force is inhibited from being restricted by the upper limit value as shown by the dotted line in FIG. 5, and the target drive force is kept constant as shown by the solid line in FIG. 5. Thus, the extension of the acceleration can be maintained.

An embodiment of the present invention was explained above, but this embodiment represents only a portion of the application examples of the present invention, and the technical scope of the present invention should not be construed as limited to the specific constitution of the above-described embodiment.

The continuously variable transmission 12 mentioned above can be installed in a hybrid vehicle, and a motor can function as a drive source.

The present application claims priority based on Japanese Patent Application No. 2012-205885 filed at the Japan Patent Office on Sep. 19, 2012, the entire contents of which are incorporated by reference herein.

The invention claimed is:

1. A vehicle control device comprising:
   a vehicle speed sensor configured to detect a vehicle speed;
   an accelerator opening degree sensor configured to detect an accelerator opening degree; and
   a controller, comprising:
   a target drive force setting unit configured to set a target drive force based on a vehicle speed and an accelerator opening degree;
   a target speed ratio setting unit configured to set a target speed ratio of a continuously variable transmission so as to realize the target drive force; and
   a target torque unit configured to set a target torque of a drive source based on the target drive force and the target speed ratio,
   an acceleration requirement determination unit configured to determine an acceleration requirement based on the accelerator opening degree; and
   a mode switching unit configured to switch a running mode to a normal mode or an acceleration requirement mode based on the acceleration requirement,
   wherein if the running mode is switched from the normal mode to the acceleration requirement mode by the mode switching unit, the target drive force setting unit is configured to set the target drive force based on the vehicle speed detected by the vehicle speed sensor at the time of mode switching and the accelerator opening degree detected by the accelerator opening degree sensor and, if the running mode is maintained in the normal mode, the target drive force setting unit is configured to set the target drive force based on the accelerator opening degree detected by the accelerator opening degree sensor and a current vehicle speed detected by the vehicle speed sensor.

2. The vehicle control device according to claim 1, wherein if the accelerator opening degree increases beyond a predetermined opening degree after entering the acceleration requirement mode, the acceleration requirement determination unit is configured to determine that further acceleration is required, and
   if the further acceleration is required while in the acceleration requirement mode, the target drive force setting unit is configured to set the target drive force based on the accelerator opening degree and a vehicle speed at the time that the further acceleration was required.

3. The vehicle control device according to claim 1, further comprising an accelerator opening degree correction unit configured to reduce the accelerator opening degree in the acceleration requirement mode to less than the accelerator opening degree in the normal mode.

4. A method for controlling a vehicle, comprising:
   setting a target drive force based on a vehicle speed and an accelerator opening degree;
   setting a target speed ratio of a continuously variable transmission so as to realize the target drive force; and
   setting a target torque of a drive source based on the target drive force and the target speed ratio,
   wherein the method for controlling the vehicle further comprises:
   detecting a vehicle speed;
   detecting an accelerator opening degree;
   determining an acceleration requirement based on the accelerator opening degree; and
   switching a running mode to a normal mode or an acceleration requirement mode based on the acceleration requirement,
   wherein if the running mode is switched from the normal mode to the acceleration requirement mode, the target drive force is set based on the detected vehicle speed at the time of mode switching and the detected accelerator opening degree and, if the running mode is maintained in the normal mode, the target drive force is set based on the detected accelerator opening degree and a current detected vehicle speed.

5. A vehicle control device comprising:
   target drive force setting means for setting a target drive force based on a vehicle speed and an accelerator opening degree;
   target speed ratio setting means for setting a target speed ratio of a continuously variable transmission so as to realize the target drive force; and
   target torque setting means for setting a target torque of a drive source based on the target drive force and the target speed ratio,
   wherein the vehicle control device further comprises:
   vehicle speed detection means for detecting a vehicle speed;
   accelerator opening degree detection means for detecting an accelerator opening degree;
   acceleration requirement determination means for determining an acceleration requirement based on the accelerator opening degree; and
   mode switching means for switching a running mode to a normal mode or an acceleration requirement mode based on the acceleration requirement,
   wherein if the running mode is switched from the normal mode to the acceleration requirement mode, the target drive force setting means sets the target drive force based on the vehicle speed detected by the vehicle speed detection means at the time of mode switching and the accelerator opening degree detected by the accelerator opening degree detection means and, if the running mode is maintained in the normal mode, the target drive force setting means is configured to set the target drive force based on the accelerator opening degree detected by the accelerator opening degree detection means and a current vehicle speed detected by the vehicle speed detection means.

* * * * *